US011721996B2

(12) United States Patent　(10) Patent No.: US 11,721,996 B2
Lee　(45) Date of Patent: Aug. 8, 2023

(54) INTELLIGENT POWER SUPPLY DEVICE AND VOLTAGE CONTROL METHOD THEREOF

(71) Applicant: ESH Technology CO., LTD., New Taipei (TW)

(72) Inventor: Han-Tse Lee, New Taipei (TW)

(73) Assignee: ESH TECHNOLOGY CO., LTD., New Taipei (TW)

(*) Notice: Subject to any disclaimer, the term of this patent is extended or adjusted under 35 U.S.C. 154(b) by 535 days.

(21) Appl. No.: 16/706,475

(22) Filed: Dec. 6, 2019

(65) Prior Publication Data

US 2020/0212699 A1　Jul. 2, 2020

(30) Foreign Application Priority Data

Jan. 2, 2019　(TW) ................................ 108200012

(51) Int. Cl.
*H02J 1/10*　(2006.01)
*H02J 7/00*　(2006.01)
*H02J 7/34*　(2006.01)
*H02J 13/00*　(2006.01)

(52) U.S. Cl.
CPC .......... *H02J 7/0068* (2013.01); *H02J 7/0031* (2013.01); *H02J 7/0047* (2013.01); *H02J 7/00302* (2020.01); *H02J 7/00306* (2020.01); *H02J 7/34* (2013.01); *H02J 13/00001* (2020.01); *H02J 13/00006* (2020.01)

(58) Field of Classification Search
CPC .. H02J 7/0068; H02J 7/00302; H02J 7/00306; H02J 7/0031; H02J 7/0047; H02J 7/34; H02J 13/00001; H02J 13/00006; H02J 7/0029
See application file for complete search history.

(56) References Cited

U.S. PATENT DOCUMENTS

| 6,555,990 B1* | 4/2003 | Yang ...................... H02J 7/0042 320/113 |
| 2005/0077878 A1* | 4/2005 | Carrier ................ H01M 50/583 320/134 |
| 2015/0171632 A1* | 6/2015 | Fry ......................... H02J 7/342 307/22 |
| 2018/0262026 A1* | 9/2018 | Gurtner .................... H02H 7/18 |
| 2018/0309315 A1* | 10/2018 | Der ...................... H02J 7/00714 |

* cited by examiner

*Primary Examiner* — Elim Ortiz
(74) *Attorney, Agent, or Firm* — Hamre, Schumann, Mueller & Larson, P.C.

(57) ABSTRACT

An intelligent power supply device includes: battery; a DC power bus coupled to the battery; a communication unit; a processor unit coupled to the communication unit; a voltage control unit coupled to the DC power bus and the processor unit; and an output connector. The processor unit is for receiving a setting command from a portable device via the communication unit, generates a control signal, and adjusts the control signal based on at least a voltage setting value indicated by the set command. The voltage control unit converts, based on the control signal, a DC discharge voltage that is provided by the battery at the DC power bus into a DC output voltage that is to be outputted at the output connector.

13 Claims, 2 Drawing Sheets

INTELLIGENT POWER SUPPLY DEVICE AND VOLTAGE CONTROL METHOD THEREOF

CROSS-REFERENCE TO RELATED APPLICATION

This application claims priority of Taiwanese Patent Application No. 108200012, filed on Jan. 2, 2019.

FIELD

The disclosure relates to power supply, and more particularly to an intelligent power supply device and a voltage control method thereof.

BACKGROUND

For various types of portable electronic products, battery capacities thereof are different, and supply voltages or currents required thereby are also different. Therefore, each type of the electronic products is used with a dedicated type of chargers that converts alternating current (AC) power (e.g., mains electricity) into direct current (DC) power to charge or to power the type of the electronic products at a rated current. In addition, because power consumptions of the electronic products are not low, portable power banks are widely used to power the electronic products.

Each existing portable power bank provides a DC supply voltage with a fixed magnitude of, for example, 5V, 6V, 9V or 12V. However, when there are multiple electronic products that require DC supply voltages with different magnitudes, a single portable power bank cannot be used to power all of these electronic products.

SUMMARY

Therefore, an object of the disclosure is to provide an intelligent power supply device that supplies a DC output voltage with a variable magnitude, and a voltage control method thereof.

According to an aspect of the disclosure, the intelligent power supply device is operatively associated with a portable device, and includes a battery, a direct current (DC) power bus, a communication unit, a processor unit, a voltage control unit and an output connector. The battery is operable between a charge mode and a discharge mode, and provides a DC discharge voltage when operating in the discharge mode. The DC power bus is coupled to the battery for receiving the DC discharge voltage therefrom. The communication unit is for receiving, from the portable device, a setting command that indicates a voltage setting value. The processor unit is coupled to the communication unit for receiving the setting command therefrom, generates a control signal, and adjusts the control signal based on at least the voltage setting value indicated by the setting command. The voltage control unit is coupled to the DC power bus and the processor unit for receiving the DC discharge voltage and the control signal respectively therefrom, and converts the DC discharge voltage into a DC output voltage having a magnitude at the voltage setting value based on the control signal. The output connector is coupled to the voltage control unit, and the DC output voltage is outputted at the output connector.

According to another aspect of the disclosure, the voltage control method is to be implemented by a processor unit of an intelligent power supply device. The intelligent power supply device is operatively associated with a portable device, and further includes a battery, a communication unit coupled to the processor unit, a voltage control unit coupled to the battery and the processor unit, and an output connector coupled to the voltage control unit. The voltage control unit converts, based on a control signal that is provided by the processor, a DC discharge voltage that is provided by the battery into a DC output voltage that is to be outputted at the output connector. The voltage control method includes: receiving a setting command from the portable device via the communication unit, the setting command indicating a voltage setting value; controlling the display unit to display the voltage setting value indicated by the setting command; detecting whether an operation is performed on the switch unit within a predetermined time interval counting from a time point at which the setting command is received; and when the operation is detected within the predetermined time interval, adjusting the control signal based on at least the voltage setting value indicated by the setting command, so as to make the voltage control unit convert, based on the control signal, the DC discharge voltage into the DC output voltage having a magnitude at the voltage setting value.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
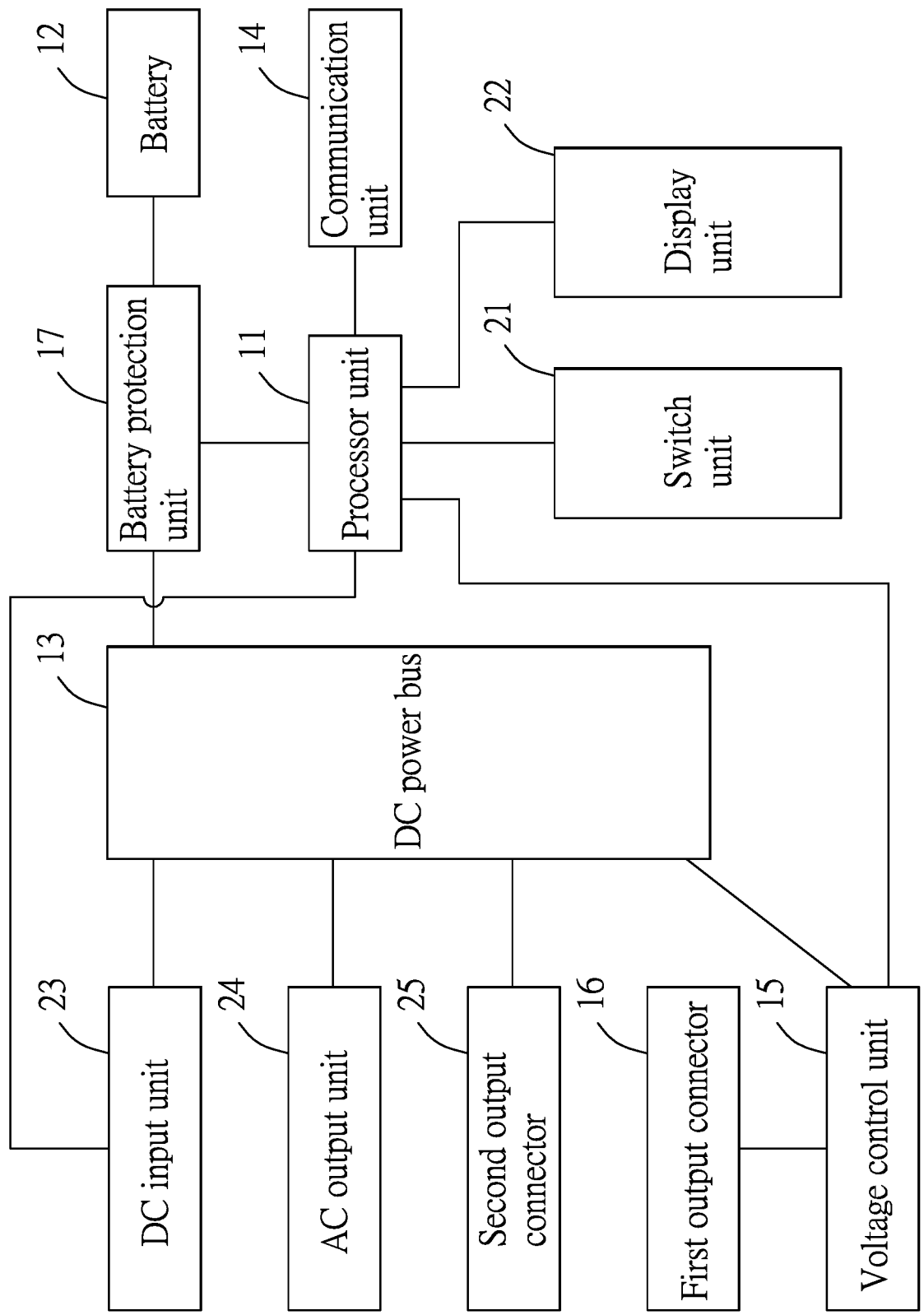
FIG. 1 is a block diagram illustrating an embodiment of an intelligent power supply device according to the disclosure.

Referring to FIG. 1, an embodiment of an intelligent power supply device according to the disclosure is operatively associated with a portable device (not shown), and includes a processor unit 11, a battery 12, a direct current (DC) power bus 13, a communication unit 14, a voltage control unit 15, a first output connector 16, a battery protection unit 17, a switch unit 21, a display unit 22, a DC input unit 23, an alternating current (AC) output unit 24 and a second output connector 25. In the embodiment, the portable device is a smart phone, a tablet computer, a notebook computer, or a smart watch.

The DC input unit 23 is for receiving a DC input voltage, and provides a DC charge voltage based on the DC input voltage. In this embodiment, the DC input unit includes a DC-to-DC converter (not shown) for converting the DC input voltage into the DC charge voltage. However, in other embodiment, the DC input unit 23 may take the DC input voltage as the DC charge voltage.

The DC power bus 13 is coupled to the DC input unit 23 for receiving the DC charge voltage therefrom.

The battery 12 is rechargeable, is operable between a charge mode and a discharge mode, and provides a DC discharge voltage when operating in the discharge mode. The battery 12 operates in the discharge mode when the DC input unit 23 does not receive the DC input voltage while a state of charge (SOC) of the battery 12 is greater than a predetermined SOC lower limit, and operates in the charge mode when the DC input unit 23 receives the DC input voltage while the SOC of the battery 12 is lower than a predetermined SOC upper limit (e.g., 85%).

The battery protection unit 17 is coupled between the DC power bus 13 and the battery 12, detects a magnitude of the DC discharge voltage and/or a magnitude of a discharge current provided by the battery 12 when the battery 12 operates in the discharge mode, and detects a magnitude of the DC charge voltage and/or a magnitude of a charge current received by the battery 12 when the battery 12 operates in the charge mode. The battery protection unit 17 establishes connection between the DC power bus 13 and the battery 12 in a normal condition, so the DC power bus 13 receives the DC discharge voltage from the battery 12 via the connection when the battery 12 operates in the discharge mode, and the battery 12 receives the DC charge voltage from the DC power bus 13 via the connection when it operates in the charge mode. The normal condition may refer to, for example, that each of the magnitudes of the DC discharge voltage and the discharge current is smaller than or equal to a respective predetermined value when the battery 12 operates in the discharge mode, and that each of the magnitudes of the DC charge voltage and the charge current is smaller than or equal to a respective predetermined value when the battery 12 operates in the charge mode. The battery protection unit 17 breaks the connection between the DC power bus 13 and the battery 12 when it determines that at least one of these magnitudes is abnormal (e.g., exceeding the respective predetermined value). In an example, the battery protection unit 17 breaks the connection when it determines that each of at least one of these magnitudes exceeds the respective predetermined value, so as to achieve over-voltage and over-current protection. In the normal condition, the magnitudes of the DC discharge voltage and the DC charge voltage may be equal to the same predetermined voltage value that falls within a range, for example, from 7V to 21V, or may be respectively equal to different predetermined voltage values.

The AC output unit 24 is coupled to the DC power bus 13 for receiving the DC discharge voltage therefrom, and includes a DC-to-AC converter for converting the DC discharge voltage into an AC output voltage. In an example, the AC output voltage has a frequency of 60 Hz and an amplitude of 110V.

The second output connector 25 (e.g., a universal serial bus (USB) type-A connector) is coupled to the DC power bus 13, and the DC discharge voltage received by the DC power bus 13 is outputted at the second output connector 25.

The voltage control unit 15 is coupled to the DC power bus 13 for receiving the DC discharge voltage therefrom, further receives a control signal, and converts the DC discharge voltage into a DC output voltage based on the control signal. In this embodiment, the voltage control unit 15 includes an H-bridge buck-boost converter for converting the DC discharge voltage into the DC output voltage; the H-bridge buck-boost converter includes four switches that operate based on the control signal; and a duty cycle of the control signal determines how much power is transferred by the H-bridge buck-boost converter.

The first output connector 16 (e.g., a DC power lack) is coupled to the voltage control unit 15, and the DC output voltage generated by the voltage control unit 15 is outputted at the first output connector 16.

The communication unit 14 complies with the same wireless communication protocol (e.g., Bluetooth, Wi-Fi or the like) as the portable device, and is adapted to be linked to the portable device for receiving therefrom a setting command that indicates a voltage setting value. In application, the portable device generates the setting command based on an operation performed thereon by a user, and the voltage setting value indicated by the setting command is determined by the user based on a magnitude of a DC supply voltage required by an electronic product that is to be charged or powered by the intelligent power supply device of this embodiment.

The processor unit 11 (e.g., a microcontroller unit, MCU) is coupled to the communication unit 14, the voltage control unit 15, the battery protection unit 17, the switch unit 21, the display unit 22 and the DC input unit 23, generates the control signal for receipt by the voltage control unit 15, and includes an analog-to-digital converter for detecting the magnitude of the DC input voltage and the magnitude of the DC output voltage.

Figure 2:
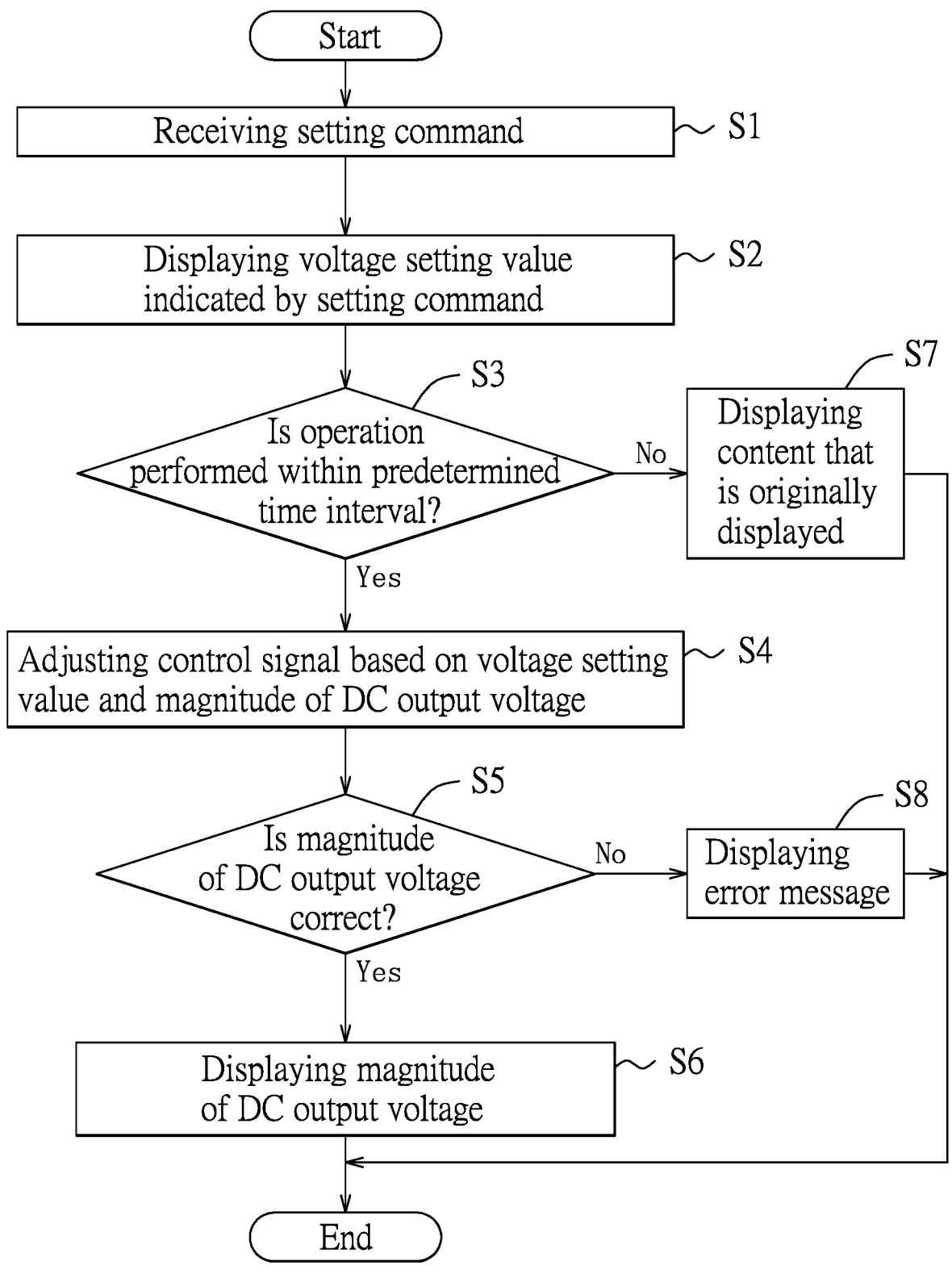
FIG. 2 is a flow chart illustrating a voltage control method performed by the embodiment.

Referring to FIGS. 1 and 2, a voltage control method performed by the processor unit 11 includes the following steps (S1-S8).

In step (S1), the processor unit 11 receives the setting command from the communication unit 14.

In step (S2), the processor unit 11 controls the display unit 22 to display the voltage setting value indicated by the setting command.

In step (S3), the processor unit 11 detects whether an operation is performed on the switch unit 21 within a predetermined time interval (e.g., 5 seconds) counting from a time point at which the set command is received thereby. If affirmative, the flow proceeds to step (S4). Otherwise, the flow goes to step (S7).

The switch unit 21 may include a button, a press key or a touch module. In application, the user operates the switch unit 21 (e.g., press the button, press the key, or touch the touch module) when he/she determines that a voltage value displayed by the display unit 22 is correct (i.e., identical to the desired voltage setting value).

In step (S4), the processor unit 11 adjusts the control signal based on at least the voltage setting value indicated by the setting command.

In this embodiment, the processor unit 11 performs pulse width modulation (PWM) upon the control signal based on the voltage setting value and the magnitude of the DC output voltage to change the duty cycle of the control signal, thereby stabilizing the magnitude of the DC output voltage at the voltage setting value. Initially, the processor unit 11 adjusts the duty cycle of the control signal to $((2 \times \text{Vout} - \text{Vset})/\text{Vmax} - A)/B$, where Vout denotes the magnitude of the DC output voltage, Vset denotes the voltage setting value, Vmax denotes a predetermined maximum magnitude of the DC output voltage, and each of A and B is a constant greater than zero and smaller than one. In an example, $A=0.166$ and $B=0.833$. Thereafter, the processor unit 11 uses proportional-integral (PI) control techniques to adjust the duty cycle of the control signal based on a difference between the voltage setting value and the magnitude of the DC output voltage (e.g., a result of subtracting the voltage setting value from the magnitude of the DC output voltage), so as to make the magnitude of the DC output voltage equal to the voltage setting value.

In step (S5), the processor unit 11 determines whether the magnitude of the DC output voltage is correct (i.e., the magnitude of the DC output voltage is equal to the voltage setting value). If affirmative, the flow goes to step (S6). Otherwise, the flow proceeds to step (S8).

In step (S6), the processor unit 11 controls the display unit 22 to display the magnitude of the DC output voltage, so as to inform the user of the magnitude of the DC output voltage.

In step (S7), the processor unit 11 controls the display unit 22 to display the content that is originally displayed by the display unit 22 prior to step (S2).

In step (S8), the processor unit 11 controls the display unit 22 to display an error message (e.g., an error code), so as to inform the user that the DC output voltage cannot be generated correctly.

In addition, the processor unit 11 is for receiving the magnitudes of the DC discharge voltage and the DC charge voltage from the battery protection unit 17, calculates a number of charge-discharge cycles of the battery 12 based on the magnitudes of the DC discharge voltage and the DC charge voltage, and generates a first indication signal that indicates the number of charge-discharge cycles. The processor unit 11 transmits the first indication signal to the portable device via the communication unit 14, so the portable device can display the number of charge-discharge cycles based on the first indication signal and the user can know residual lifetime of the battery 12.

Moreover, the processor unit 11 controls the DC input unit 23 to stop converting the DC input voltage into the DC charge voltage when the magnitude of the DC charge voltage is outside a predetermined voltage range (e.g., 5V-24V), so as to prevent the intelligent power supply device of this embodiment from being damaged.

Furthermore, the processor unit 11 generates a second indication signal that indicates the magnitude of the DC output voltage when it determines that the magnitude of the DC output voltage is correct, and that indicates the error message when otherwise. The processor unit 11 transmits the second indication signal to the portable device via the communication unit 14, so the portable device can display the magnitude of the DC output voltage or the error message based on the second indication signal.

In this embodiment, the display unit 22 includes a light emitting diode (LED) array for displaying numbers, but the disclosure is not limited thereto. Moreover, in other embodiments, the switch unit 21 may be omitted, and the processor unit 11 may adjust the control signal after the setting command is received thereby.

In view of the above, in this embodiment, by virtue of the processor unit 11 that adjusts the control signal based on the setting command from the portable device, and by virtue of the voltage control unit 15 that generates the DC output voltage based on the control signal, the DC output voltage has a variable magnitude that can be set by operating the portable device. In addition, by virtue of the processor unit 11 that controls the display unit 22 to display the magnitude of the DC output voltage or the error message, it is convenient for the user to monitor the operation of the intelligent power supply device.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that the disclosure is not limited to the disclosed embodiment but is intended to cover various arrangements included within the spirit and scope of the broadest interpretation so as to encompass all such modifications and equivalent arrangements.

What is claimed is:

1. An intelligent power supply device, comprising:
    a battery operable between a charge mode and a discharge mode, and providing a direct current (DC) discharge voltage when operating in the discharge mode;
    a DC power bus coupled to the battery for receiving the DC discharge voltage therefrom;
    a communication circuit adapted to wirelessly receive from a portable device, a setting command that indicates a voltage setting value;
    a processor unit coupled to the communication circuit for receiving the setting command therefrom, generating a control signal, and adjusting the control signal based on at least the voltage setting value indicated by the setting command;
    a voltage control unit coupled to the DC power bus and the processor unit for receiving the DC discharge voltage and the control signal respectively therefrom, and converting the DC discharge voltage into a DC output voltage having a magnitude at the voltage setting value based on the control signal;
    a first output connector which is coupled to the voltage control unit, and at which the DC output voltage is outputted;
    a DC input unit coupled to the DC power bus, for receiving a DC input voltage, and providing a DC charge voltage to the DC power bus based on the DC input voltage; and
    a battery protection unit coupled between the battery and the DC power bus, detecting, when the battery operates in the discharge mode, a magnitude of the DC discharge voltage and a magnitude of a discharge current provided by the battery, and detecting, when the battery operates in the charge mode, a magnitude of the DC charge voltage and a magnitude of a charge current received by the battery,
    wherein:
    the battery receiving the DC charge voltage from the DC power bus when operating in the charge mode,
    the battery protection unit establishing connection between the battery and the DC power bus when each of the magnitudes of the DC discharge voltage, the discharge current, the DC charge voltage and the charge current is smaller than or equal to a respective predetermined value, and
    the battery protection unit breaking the connection between the battery and the DC power bus when it determines that at least one of the magnitudes of the DC discharge voltage, the discharge current, the DC charge voltage and the charge current exceeds the respective predetermined value.

2. The intelligent power supply device of claim 1, further comprising a switch unit that is coupled to the processor unit, wherein:
    the processor unit further detects whether an operation is performed on the switch unit within a predetermined time interval counting from a time point at which the setting command is received thereby, and adjusts the control signal when the operation is detected within the predetermined time interval.

3. The intelligent power supply device of claim 1, further comprising a display unit that is coupled to the processor unit, wherein:

the processor unit further detects the magnitude of the DC output voltage, and controls the display unit to display the magnitude of the DC output voltage when it determines that the magnitude of the DC output voltage is equal to the voltage setting value, and to display an error message when otherwise.

4. The intelligent power supply device of claim 1, further comprising a display unit that is coupled to the processor unit, wherein:

the processor unit further controls the display unit to display the voltage setting value.

5. The intelligent power supply device of claim 1, further comprising a display unit that is coupled to the processor unit, wherein:

the processor unit is further coupled to the battery protection unit for receiving the magnitudes of the DC discharge voltage and the DC charge voltage therefrom, calculates a number of charge-discharge cycles of the battery based on the magnitudes of the DC discharge voltage and the DC charge voltage, generates an indication signal that indicates the number of charge-discharge cycles, and transmits the indication signal via the communication circuit.

6. The intelligent power supply device of claim 1, further comprising an alternating current (AC) output unit that is coupled to the DC power bus for receiving the DC discharge voltage therefrom, and that converts the DC discharge voltage into an AC output voltage.

7. The intelligent power supply device of claim 1, further comprising a second output connector which is coupled to the DC power bus, and at which the DC discharge voltage is outputted.

8. The intelligent power supply device of claim 7, wherein the second output connector is a universal serial bus (USB) type-A connector.

9. The intelligent power supply device of claim 1, wherein:

the processor unit further detects the magnitude of the DC output voltage; and a duty cycle of the control signal is adjusted to $((2 \times Vout - Vset)Nmax - 0.166)/0.833$, where Vout denotes the magnitude of the DC output voltage, where Vset denotes the voltage setting value, and where Vmax denotes a predetermined maximum magnitude of the DC output voltage.

10. The intelligent power supply device of claim 9, wherein the processor unit further adjusts the duty cycle of the control signal based on a difference between the voltage setting value and the magnitude of the DC output voltage, so as to make the magnitude of the DC output voltage equal to the voltage setting value.

11. The intelligent power supply device of claim 1, wherein the first output connector is a DC power jack.

12. The intelligent power supply device of claim 1, wherein the communication circuit complies with the same wireless communication protocol as the portable device.

13. The intelligent power supply device of claim 1, wherein the magnitude of the DC discharge voltage falls within a range of 7V to 21V.

\* \* \* \* \*